(12) United States Patent
Bittner

(10) Patent No.: US 7,849,701 B2
(45) Date of Patent: Dec. 14, 2010

(54) REFRIGERATION SYSTEM WITH A CHARGING LOOP

(75) Inventor: John D. Bittner, Bethlehem, GA (US)

(73) Assignee: Hill Phoenix, Inc., Conyers, GA (US)

( * ) Notice: Subject to any disclaimer, the term of this patent is extended or adjusted under 35 U.S.C. 154(b) by 428 days.

(21) Appl. No.: 12/132,384

(22) Filed: Jun. 3, 2008

(65) Prior Publication Data

US 2009/0293517 A1    Dec. 3, 2009

(51) Int. Cl.
F25D 17/02    (2006.01)

(52) U.S. Cl. .......................... 62/185; 62/201

(58) Field of Classification Search .................. 62/149, 62/185, 201, 430, 435, 436
See application file for complete search history.

(56) References Cited

U.S. PATENT DOCUMENTS

| | | | |
|---|---|---|---|
| 4,415,847 A * | 11/1983 | Galloway | ................... 320/150 |
| 5,743,102 A | 4/1998 | Thomas et al. | |
| 5,921,092 A | 7/1999 | Behr et al. | |
| 6,094,925 A | 8/2000 | Arshansky et al. | |
| 6,170,270 B1 | 1/2001 | Arshansky et al. | |
| 6,185,951 B1 | 2/2001 | Lane et al. | |
| 6,202,425 B1 | 3/2001 | Arshansky et al. | |
| 6,502,412 B1 | 1/2003 | Dubé | |
| 6,708,511 B2 | 3/2004 | Martin | |
| 6,823,682 B1 | 11/2004 | Jenkins et al. | |
| 6,871,509 B2 | 3/2005 | Grabon et al. | |
| 6,883,343 B2 | 4/2005 | Lane et al. | |
| 6,889,514 B2 | 5/2005 | Lane et al. | |
| 6,889,518 B2 | 5/2005 | Lane et al. | |
| 6,915,657 B1 | 7/2005 | Wood | |
| 6,981,385 B2 | 1/2006 | Arshansky et al. | |
| 7,114,349 B2 | 10/2006 | Lifson et al. | |
| 7,159,413 B2 | 1/2007 | Dail | |
| 7,270,278 B2 | 9/2007 | Street et al. | |
| 2005/0103033 A1 * | 5/2005 | Schwartz et al. | ............... 62/185 |
| 2005/0126196 A1 | 6/2005 | Grassmuck et al. | |
| 2005/0172659 A1 * | 8/2005 | Barker et al. | ................... 62/430 |
| 2007/0089437 A1 | 4/2007 | Singh et al. | |
| 2007/0089453 A1 | 4/2007 | Shapiro | |
| 2007/0089454 A1 | 4/2007 | Shapiro | |
| 2007/0235681 A1 | 10/2007 | Fukushima | |
| 2007/0289323 A1 | 12/2007 | Swofford et al. | |

\* cited by examiner

*Primary Examiner*—Marc E Norman
(74) *Attorney, Agent, or Firm*—Foley & Lardner LLP

(57) ABSTRACT

A refrigeration system includes a primary loop that cools a secondary loop that circulates a coolant through a refrigeration load. The secondary loop includes a suction header to receive the coolant from the load, and a discharge header to direct the coolant to the heat exchanger, and a pump to pump the coolant from the suction to the discharge header. A charging loop maintains a pressure of the coolant in the supply header within a predetermined range, and includes an inlet from the discharge header and an outlet to the suction header. A flow nozzle and a valve are located between the inlet and the outlet, and a reservoir of make-up coolant communicates with the flow nozzle. Upon a low pressure condition in the suction header, the valve opens to permit flow of coolant through the flow nozzle to draw in make-up coolant from the reservoir.

17 Claims, 2 Drawing Sheets

REFRIGERATION SYSTEM WITH A CHARGING LOOP

BACKGROUND

It is well known to provide a refrigeration system including a refrigeration device such as a refrigerated case, refrigerator, freezer, etc. for use in commercial, institutional and industrial applications involving the storage and/or display of objects, products and materials. For example, it is known to provide a refrigeration system with one or more refrigerated cases for display and storage of frozen or refrigerated foods in a supermarket to maintain the foods at a suitable temperature (e.g. 32 to 35 deg F.). Such systems may include a primary refrigerant loop and a secondary cooling loop that interface with one another through a heat exchanger so that a primary refrigerant cools or chills a liquid coolant that is circulated through one or more refrigeration devices to provide cooling to the temperature-controlled objects stored or displayed therein. Such liquid coolant in such secondary cooling loops is typically circulated by a pump that draws coolant from a suction header and discharges the coolant to a discharge header. It would be desirable to provide a refrigeration system with a charging loop that is operable to maintain a pressure of the coolant in the suction header within a desired predetermined range. It would also be desirable to provide a charging loop that includes a minimum number of moving parts to simplify operation and maintenance of the system. It would be further desirable to provide a charging loop that provides make-up coolant to the suction header automatically upon a low-pressure condition. It would also be desirable to provide primary and back-up sources of make-up coolant to minimize the potential for introducing air into the secondary cooling system. Accordingly, it would be desirable to provide a refrigeration system having any one or more of these or other advantageous features.

SUMMARY

One embodiment relates to a refrigeration system, comprising a primary refrigeration loop configured to circulate a refrigerant through a first side of at least one heat exchanger; and a secondary cooling loop configured to circulate a liquid coolant through a second side of the heat exchanger and through at least one refrigeration load. The secondary cooling loop including a suction header configured to receive the liquid coolant from the refrigeration load, and a discharge header configured to direct the liquid coolant to the heat exchanger, and at least one pump configured to pump the liquid coolant from the suction header to the discharge header. The refrigeration system further includes a charging loop configured to maintain a pressure of the liquid coolant in the supply header within a predetermined range. The charging loop comprises an inlet coupled to the discharge header and an outlet coupled to the suction header; a flow nozzle disposed between the inlet and the outlet, a valve disposed between the inlet and the outlet, and a primary reservoir for containing liquid coolant and communicating with the flow nozzle. The valve is operable for movement between an open position to permit flow of liquid coolant through the flow nozzle, and a closed position to prevent flow of liquid coolant through the flow nozzle.

Another embodiment relates to a refrigeration system, comprising a heat exchanger configured to provide cooling to a liquid coolant; and a secondary cooling loop configured to circulate the liquid coolant through the heat exchanger and through at least one refrigeration device. The secondary cooling loop includes a suction line configured to receive the liquid coolant from the refrigeration device, and a discharge line configured to direct the liquid coolant to the heat exchanger, and at least one pump configured to pump the liquid coolant from the suction line to the discharge line. The refrigeration system further includes a charging loop configured to maintain a pressure of the liquid coolant in the supply line within a predetermined range, the predetermined range defined by a predetermined low pressure setpoint and a predetermined high pressure setpoint. The charging loop comprises an inlet coupled to the discharge line and an outlet coupled to the suction line; a venturi nozzle disposed between the inlet and the outlet, a valve disposed between the inlet and the outlet, and a reservoir configured to provide an auxiliary supply of liquid coolant to the venturi nozzle. The valve is positionable in an open position to permit flow of liquid coolant through the venturi nozzle, and a closed position to prevent flow of liquid coolant through the venturi nozzle. The charging loop further includes a control system operable to monitor a pressure of the liquid coolant in the supply line and to open the valve when the pressure of the liquid coolant in the supply line decreases to the predetermined low pressure setpoint, so that liquid coolant flows from the discharge line to the supply line and draws the auxiliary supply of liquid coolant through the venturi nozzle and into the suction line.

Still another embodiment relates to a refrigeration system, comprising a cooling loop configured to circulate a liquid coolant through a plurality of refrigeration devices to provide cooling to the refrigeration devices; and a charging line operable to maintain a pressure of the liquid coolant in the supply line within a predetermined range, the predetermined range defined by a predetermined low pressure setpoint and a predetermined high pressure setpoint. The cooling loop includes a suction line configured to receive the liquid coolant from the refrigeration devices, and a discharge line configured to direct the liquid coolant to the refrigeration devices, and at least one pump configured to pump the liquid coolant from the suction line to the discharge line. The charging line comprises an inlet configured to receive liquid coolant from the discharge line and an outlet configured to supply liquid coolant to the suction line; a venturi nozzle disposed between the inlet and the outlet, a valve disposed between the inlet and the outlet; a reservoir providing an auxiliary supply of liquid coolant to the venturi nozzle; and a control system operable to open the valve when the pressure of the liquid coolant in the supply line decreases to a predetermined low pressure, so that liquid coolant flows from the discharge line to the supply line and draws liquid coolant from the reservoir and through the venturi nozzle and into the suction line.

DETAILED DESCRIPTION

Before turning to the figures, which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
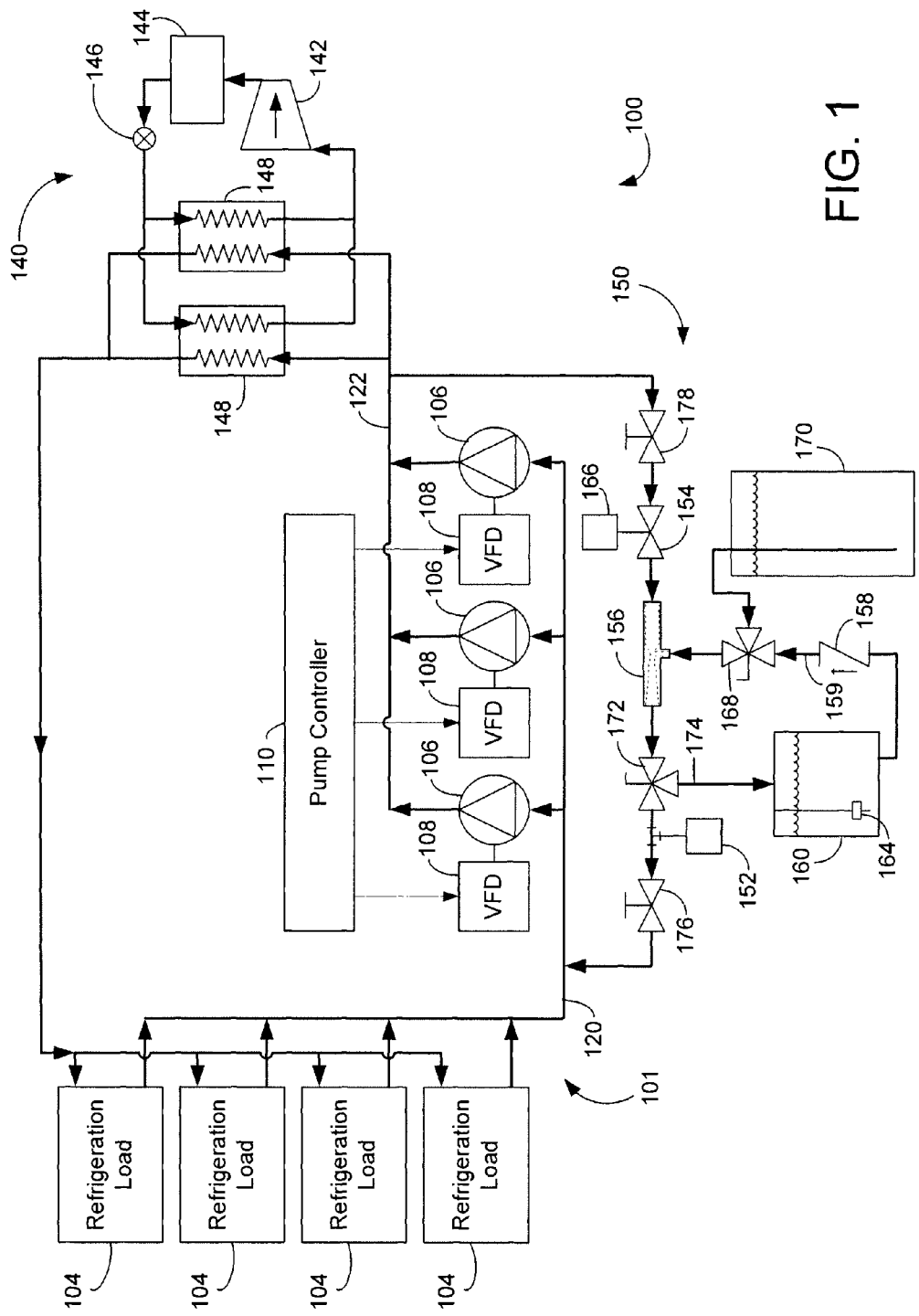
FIG. 1 is a block diagram of a refrigeration system including a charging loop according to an exemplary embodiment.

Referring to FIG. 1, a refrigeration system 100 is shown according to an exemplary embodiment. Refrigeration system 100 typically include a refrigerant (e.g., a vapor compression/expansion type refrigerant, etc.) or coolant (e.g. liquid or fluid coolant, etc.) that circulates through a series of components in a closed system to maintain a cold region (e.g., a region with a temperature below the temperature of the surroundings). The refrigeration system 100 of FIG. 1 includes several subsystems or loops.

Refrigeration system 100 is configured to provide a cooling function to one or more refrigeration loads 104 by controlling coolant flow through secondary coolant system or secondary cooling loop 101 (e.g., a hydronic loop, a heat exchange loop, etc.). Refrigeration loads 104 may include any of a wide variety of objects to be cooled such as temperature controlled storage devices (e.g., refrigerated display cases, walk-in coolers, freezers, etc.). Secondary cooling system 101 also includes one or more pumps 106, and may include one or more variable frequency drives (VFD) 108 associated with pumps 106, and a pump controller 110. Each pump 106 is understood to include a motor that receives the AC electric power from a VFD and converts the electric power to rotational motion of a shaft which drives the pump. Although the system is shown to include variable frequency drives, according to alternative embodiments, the system may be provides with constant-speed pump stations.

Refrigeration system 100 is also shown to include a primary refrigerant loop 140 for circulating a refrigerant (e.g., a direct expansion type refrigerant, etc.) through a compressor 142 and a condenser 144 and an expansion device 146 to one or more chillers 148 and back to the compressor 142. The chillers 148 are heat exchangers (e.g., plate type heat exchangers or the like) shown to be located "downstream" of the secondary coolant pumps 106 and to provide an interface between the secondary coolant system 101 and the refrigerant of the primary loop to provide "chilling" or cooling of the secondary coolant fluid by the refrigerant.

According to one exemplary embodiment, refrigeration system 100 includes a secondary coolant system 101, as may be used in refrigeration of refrigeration loads 104 such as temperature controlled storage devices in facilities such as food retailing outlets (e.g., supermarkets, bakeries, etc.). According to other exemplary embodiments, refrigeration system 100 may be used with another secondary coolant refrigeration system in any commercial, industrial, institutional or residential application or may include one or more loops of a primary coolant refrigeration system. While FIG. 1 illustrates four refrigeration loads 104, according to other exemplary embodiments, there may be more or fewer than four loads.

Pump 106 is configured to pump a coolant fluid through secondary coolant system 101 to provide cooling to refrigeration loads 104. The coolant fluid may be any fluid capable of absorbing, transporting, and/or transferring heat (e.g., glycol, water, etc.). Multiple pumps 106 may be provided in parallel, drawing coolant fluid from a common suction header 120, and discharging coolant fluid to a common discharge header 122. While FIG. 1 illustrates three pumps, according to other exemplary embodiments, more or fewer than three pumps may be used. According to the exemplary embodiment shown in FIG. 1, pumps 106 are variable speed alternating current (AC) electric motor pumps. Direct current (DC) pumps may be used according to various alternative embodiments. According to an exemplary embodiment, the pump is configured for use in secondary coolant pump applications. Pump 106 may be a pump of any size suitable for its intended application, but according to various exemplary embodiments pump 106 has a horsepower range of 1-20 hp and a voltage range of 208-575 volts AC.

VFD 108 (e.g., adjustable-frequency drive, variable-speed drive, AC drive, microdrive or inverter drive, etc.) is a device configured to control the rotational speed of a pump 106 by controlling the frequency (and thus voltage) of the electrical power supplied to pump 106. While FIG. 1 illustrates a VFD 108 corresponding to each pump 106, according to other exemplary embodiments one VFD may be used to control multiple pumps. According to various exemplary embodiments, the VFD may be a solid state device, for example using a rectifier bridge. According to other exemplary embodiments, the VFD may include analog circuitry. According to other exemplary embodiments, the VFD may be another type of adjustable speed drive such a slip controlled drive or any other adjustable or variable speed drive.

Pump controller 110 is generally configured to control the fluid flow of coolant through system 101 based on pressure readings of the coolant at various locations (e.g. inlet or outlet to the refrigeration loads, etc.). Pump controller 110 may control the fluid flow by controlling the speed of each individual pump 106, controlling the sequencing of the pumps, and/or conducting other pump controlling activities. According to various exemplary embodiments, pump controller 110 may be a digital and/or analog circuit. According to other exemplary embodiments, pump controller 110 may include a software controller executed on a processor or other circuit.

Refrigeration system 100 is also shown to include a primary refrigerant loop 140 for circulating a refrigerant (e.g., a direct expansion type refrigerant, etc.) through a compressor 142 and a condenser 144 and an expansion device 146 to one or more chillers 148 and back to the compressor 142. The chillers 148 are heat exchangers (e.g., plate type heat exchangers or the like) shown to be located "downstream" of the secondary coolant pumps 106 and to provide an interface between the secondary coolant system 101 and the refrigerant of the primary loop to provide "chilling" or cooling of the secondary coolant fluid by the refrigerant. Heat absorbed by the secondary coolant fluid from the refrigeration loads 104 is transferred by the chillers 148 to the refrigerant in the primary refrigerant loop 140.

Refrigeration system 100 further includes a charging loop 150 provided in parallel with the pumps 106. Charging loop 150 (e.g., automatic charge system) is configured to maintain a minimum pressure of coolant in the suction header 120. According to an exemplary embodiment, the charging loop includes a pressure sensing device such as a pressure switch 152, a flow control device such as a solenoid-controlled valve 154, a flow nozzle 156, a reservoir such as a (primary) fluid tank 160, a check valve 158, and valves 176 and 178 that are intended to provide manual isolation for servicing of the charging loop components. The charging loop 150 may further include a secondary (e.g. auxiliary) fluid tank 170 coupled to the loop 150 with a 3-way valve 168. The charging loop 150 may further include a tank fill line 174 coupled to a 3-way valve 172.

Pressure switch 152 monitors the pressure of coolant in suction header 120. Pressure switch 152 is set to a first (i.e., low pressure, minimum, lower) set point and a second (e.g., high pressure, maximum, upper) setpoint with an adjustable deadband between the maximum and low pressure setpoints. The pressure switch 152 is configured to activate at the low pressure setpoint (e.g., when there is an insufficient pressure in suction header 120) and deactivate at the high pressure setpoint (e.g., when there is a sufficient pressure in suction header 120). According to an exemplary embodiment, the pressure switch 152 has a low pressure setpoint of approximately eight (8) psig, a high pressure setpoint of approximately fourteen (14) psig, and a deadband of approximately six (6) psig. A reduction in pressure of coolant in the suction line may occur as a result of any of a wide variety of occurrences, such as reduction of temperature of the coolant, removal of air from the system, coolant leaks, etc.).

Upon a decrease in coolant pressure in the suction header 120 to the low pressure setpoint, the pressure switch 152 provides a signal (e.g. opens or closes a set of contacts in a circuit, etc.) to activate (e.g. energize, de-energize, as appropriate) a solenoid 166 to open a solenoid valve 154. With solenoid valve 154 open, coolant fluid is allowed to flow from the relatively higher pressure discharge header 122 to the relatively lower pressure suction header through the charging loop 150. The coolant fluid passes through the flow nozzle such as a Venturi-type flow nozzle 156. According to an exemplary embodiment, the flow nozzle 156 is a Mazzei® Injector model number 1078-02 commercially available from Mazzei Injector Corporation of Bakersfield, Calif. The fluid flow through the flow nozzle 156 creates a suction force with the Venturi effect to draw in additional fluid from the primary reservoir or fluid tank 160 through a suction line or supply line 159. A check valve 158 may be provided in the suction line 159 to prevent fluid from flowing back towards the primary tank 160. The flow nozzle 156 allows additional fluid to be provided to the suction header 120 without the need for an additional pump and other costly equipment.

The additional (e.g. make-up) fluid from tank 160 is drawn into the suction header 120 along with the fluid drawn from the discharge header 122 to increase the pressure in the suction header 120. Once the pressure in the suction header 120 rises to/above the high pressure setpoint (e.g., out of the set deadband), the pressure switch will (according to one exemplary embodiment) deactivate or open a set of contacts which, in turn, de-energizes the solenoid 166 to close solenoid valve 154 and halt the flow of coolant fluid through flow nozzle 156.

Figure 2:
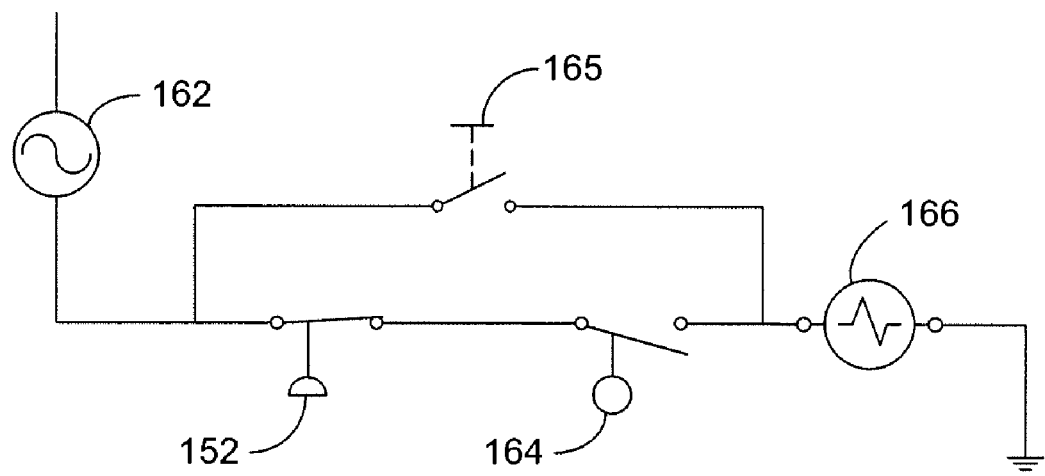
FIG. 2 is a schematic diagram of the control system controlling a solenoid for the charging loop of FIG. 1.

A float switch 164 in fluid tank 160 helps to prevent air from being drawn into the fluid stream in the flow nozzle 156, in the event that the primary tank 160 is drained. If the fluid level in the tank 160 drops below a predetermined level the float switch "opens" (e.g. opens a set of contacts in a control circuit) to de-energize the solenoid 166. FIG. 2 shows an exemplary wiring schematic of the control system circuit controlling the solenoid 166 with the pressure switch 152 closed (e.g. indicative of a low pressure condition in the suction header) but with the float switch 162 open (e.g., because of a low fluid level in tank 160), resulting in de-energizing the solenoid and closing the solenoid valve 154 to prevent coolant fluid flow through the flow nozzle 156, so that air is not drawn into the secondary cooling system. The solenoid 166 is energized by a power source 162 only if the appropriate contacts from both the pressure switch 152 and the float switch 164 are closed. A manual override device, such as a switch 165 may be provided to permit operation of the charging loop with a secondary source of make-up coolant, by opening valve 164.

A secondary reservoir or back-up fluid tank 170 may also be provided for charging loop 150. The secondary tank 170 is coupled to the charging loop 150 in parallel with the primary fluid tank 160 by a suitable valve device shown for example as a three-way valve 168. The position of the three-way valve 168 may be switched upon activation of override switch 165 (to open valve 164) so that the flow nozzle 156 draws the additional (e.g. "make-up") fluid from the secondary tank 170 instead of primary tank 160. According to one exemplary embodiment, secondary tank 170 is a portable large-volume tank (e.g. such as a 55 gallon drum, etc.). According to the illustrated embodiment, three-way valve 168 is shown for example as a manually operated valve that may have it's position changed manually in response to a primary tank low-level alarm initiated by float switch 164. According to alternative embodiments, the three-way valve may be automatically operated (e.g. by a solenoid or the like) in response to activation and deactivation of the float switch in the primary tank, or upon activation of the manual override switch, etc. According to other alternative embodiments, each tank may be provided with a two-way valve that are opened and closed (manually or automatically in response to appropriate tank level conditions/signals) to provide a continuous source of make-up coolant fluid to the charging line.

The charging loop may further include a mechanism for refilling the primary fluid tank 160. According to one exemplary embodiment, a tank fill connection 174 may be coupled to the charging loop 150 downstream from the flow nozzle 156 with a valve such as a three-way valve 172. The position of the valve 172 may be switched to divert a desired quantity of coolant fluid from secondary reservoir 170 via valve 168 to fluid tank 160 (instead of to suction header 120) to refill or "top off" fluid tank 160.

According to any preferred embodiment, a refrigeration system with an auto-charging loop is provided that includes a primary refrigeration loop configured to circulate a refrigerant through a first side of at least one heat exchanger, and a secondary cooling loop configured to circulate a liquid coolant through a second side of the heat exchanger and through at least one refrigeration device or load. The secondary cooling loop includes a suction line or header that receives the liquid coolant discharged from the refrigeration device, and a discharge line or header that directs the liquid coolant to the heat exchanger and then to the refrigeration loads, and at least one pump to pump the liquid coolant from the suction line to the discharge line. A charging loop includes pressure sensing devices that actuate valves to maintain a pressure of the liquid coolant in the supply line within a predetermined range (e.g. defined by a low pressure setpoint and a high pressure setpoint of a pressure switch). The charging loop has an inlet on the discharge line and an outlet on the suction line, and a venturi nozzle located between the inlet and the outlet. A valve is located between the inlet and the outlet, and is positionable in an open position to permit flow of liquid coolant through the venturi nozzle, and a closed position to prevent flow of liquid coolant through the venturi nozzle. A primary reservoir and a secondary or auxiliary reservoir provide a supply of make-up liquid coolant to the venturi nozzle. A control system monitors a pressure of the liquid coolant in the supply line and opens the valve when the pressure of the liquid coolant in the supply line decreases to the low pressure setpoint, so that liquid coolant flows from the discharge line to the supply line and draws the make-up supply of liquid coolant through the venturi nozzle and into the suction line.

It is important to note that the construction and arrangement of the elements of the refrigeration system provided herein are illustrative only. Although only a few exemplary embodiments of the present invention(s) have been described in detail in this disclosure, those skilled in the art who review this disclosure will readily appreciate that many modifications are possible in these embodiments (such as variations in features such as connecting structure, components, materials, sequences, capacities, shapes, dimensions, proportions and configurations of the modular elements of the system, without materially departing from the novel teachings and advantages of the invention(s). For example, any number of coolant pumps may be provide and operating in a variable speed or constant speed control scheme, and any one or more refrigeration loads may be provided that are configured to operate in series, parallel or series/parallel to cool any combination of low temperature and/or medium temperature cases. Further, it is readily apparent that variations and modifications of the refrigeration system and its components and elements may be provided in a wide variety of materials, types, shapes, sizes and performance characteristics. Accordingly, all such variations and modifications are intended to be within the scope of the invention(s).

What is claimed is:

1. A refrigeration system, comprising:
    a primary refrigeration loop configured to circulate a refrigerant through a first side of at least one heat exchanger;
    a secondary cooling loop configured to circulate a liquid coolant through a second side of the heat exchanger and through at least one refrigeration load; the secondary cooling loop including a suction header configured to receive the liquid coolant from the refrigeration load, and a discharge header configured to direct the liquid coolant to the heat exchanger, and at least one pump configured to pump the liquid coolant from the suction header to the discharge header; and
    a charging loop configured to maintain a pressure of the liquid coolant in the supply header within a predetermined range, the charging loop comprising:
    an inlet coupled to the discharge header and an outlet coupled to the suction header;
    a flow nozzle disposed between the inlet and the outlet,
    a valve disposed between the inlet and the outlet, and operable for movement between an open position to permit flow of liquid coolant through the flow nozzle, and a closed position to prevent flow of liquid coolant through the flow nozzle; and
    a primary reservoir for containing liquid coolant and communicating with the flow nozzle.

2. The refrigeration system of claim 1, wherein the charging loop further comprises a supply line coupled to the primary reservoir and the flow nozzle, and configured to deliver liquid coolant from the primary reservoir to the flow nozzle.

3. The refrigeration system of claim 2, wherein the charging loop further comprises a pressure sensing device operable to monitor a pressure of the liquid coolant in the suction header and to provide an output signal operable to move the valve to the open position when the pressure of the liquid coolant in the supply header decreases to a predetermined low pressure setpoint.

4. The refrigeration system of claim 3, wherein the pressure sensing device is operable to move the valve to the closed position when the pressure of the liquid coolant in the supply header increases to a predetermined high pressure setpoint.

5. The refrigeration system of claim 4, wherein the charging loop further comprises a level sensing device operable to monitor a level of liquid coolant in the primary reservoir and to prevent the valve from moving to the open position when the level of liquid coolant in the primary reservoir decreases to a predetermined low level setpoint.

6. The refrigeration system of claim 2, wherein the charging loop further comprises a secondary reservoir for containing liquid coolant, the secondary reservoir communicating with the supply line.

7. The refrigeration system of claim 6, wherein the charging loop further comprises a level sensing device operable to monitor a level of liquid coolant in the primary reservoir and to provide a signal operable to permit liquid coolant from the secondary reservoir to be supplied to the flow nozzle when the level of liquid coolant in the primary reservoir decreases to a predetermined low level setpoint.

8. The refrigeration system of claim 6, wherein the flow nozzle comprises a venturi nozzle configured to draw liquid coolant from one of the primary reservoir and the secondary reservoir when the valve is moved to the open position.

9. The refrigeration system of claim 1, wherein the pressure sensing device comprises a pressure switch and the valve comprises a solenoid-operated valve.

10. A refrigeration system, comprising:
    a heat exchanger configured to provide cooling to a liquid coolant;
    a cooling loop configured to circulate the liquid coolant through the heat exchanger and through at least one refrigeration device; the cooling loop including a suction line configured to receive the liquid coolant from the refrigeration device, and a discharge line configured to direct the liquid coolant to the heat exchanger, and at least one pump configured to pump the liquid coolant from the suction line to the discharge line; and
    a charging loop configured to maintain a pressure of the liquid coolant in the supply line within a predetermined range, the predetermined range defined by a low pressure setpoint and a high pressure setpoint, the charging loop comprising:
    an inlet coupled to the discharge line and an outlet coupled to the suction line;
    a venturi nozzle disposed between the inlet and the outlet,
    a valve disposed between the inlet and the outlet, and positionable in an open position to permit flow of liquid coolant through the venturi nozzle, and a closed position to prevent flow of liquid coolant through the venturi nozzle;
    a reservoir configured to provide an auxiliary supply of liquid coolant to the venturi nozzle; and
    a control system operable to monitor a pressure of the liquid coolant in the supply line and to open the valve when the pressure of the liquid coolant in the supply line decreases to the low pressure setpoint, so that liquid coolant flows from the discharge line to the supply line and draws the auxiliary supply of liquid coolant through the venturi nozzle and into the suction line.

11. The refrigeration system of claim 10 wherein the reservoir comprises a primary reservoir and a secondary reservoir.

12. The refrigeration system of claim 11 wherein the control system is operable to direct the auxiliary liquid coolant from the primary reservoir to the venturi nozzle when a level of the auxiliary liquid coolant in the primary reservoir is above a predetermined low level setpoint, and to direct the auxiliary liquid coolant from the secondary reservoir when the level of the auxiliary liquid coolant in the primary reservoir is below the predetermined low level setpoint.

13. The refrigeration system of claim 10, wherein the control system is operable to close the valve when the pressure of the liquid coolant in the supply line increases to the high pressure setpoint.

14. A refrigeration system, comprising:
    a cooling loop configured to circulate a liquid coolant through a plurality of refrigeration devices to provide cooling to the refrigeration devices; the cooling loop including a suction line configured to receive the liquid coolant from the refrigeration devices, and a discharge line configured to direct the liquid coolant to the refrigeration devices, and at least one pump configured to pump the liquid coolant from the suction line to the discharge line; and a charging line operable to maintain a pressure of the liquid coolant in the supply line within a predetermined range, the predetermined range defined by a predetermined low pressure and a predetermined high pressure, the charging line comprising:

an inlet configured to receive liquid coolant from the discharge line and an outlet configured to supply liquid coolant to the suction line;

a venturi nozzle disposed between the inlet and the outlet, a valve disposed between the inlet and the outlet;

a reservoir providing an auxiliary supply of liquid coolant to the venturi nozzle; and a control system operable to open the valve when the pressure of the liquid coolant in the supply line decreases to the predetermined low pressure, so that liquid coolant flows from the discharge line to the supply line and draws liquid coolant from the reservoir and through the venturi nozzle and into the suction line.

15. The refrigeration system of claim 14 wherein the reservoir comprises a primary reservoir and a secondary reservoir.

16. The refrigeration system of claim 15 wherein the control system is operable to direct liquid coolant from the primary reservoir to the venturi nozzle when a level of the liquid coolant in the primary reservoir is above a predetermined low level, and to direct liquid coolant from the secondary reservoir when the level of the liquid coolant in the primary reservoir is below the predetermined low level.

17. The refrigeration system of claim 14, wherein the control system is operable to close the valve when the pressure of the liquid coolant in the supply line increases to the predetermined high pressure.

* * * * *